United States Patent
Conlon et al.

(10) Patent No.: US 7,597,648 B2
(45) Date of Patent: Oct. 6, 2009

(54) INPUT BRAKE PROVIDING ELECTRIC ONLY FIXED GEAR

(75) Inventors: Brendan M. Conlon, Rochester Hills, MI (US); Alan G. Holmes, Clarkston, MI (US); Michael R. Schmidt, Carmel, IN (US); Joel M. Maguire, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 373 days.

(21) Appl. No.: 11/564,200

(22) Filed: Nov. 28, 2006

(65) Prior Publication Data

US 2008/0125264 A1    May 29, 2008

(51) Int. Cl.
*B60W 10/08*    (2006.01)
*B60W 10/18*    (2006.01)

(52) U.S. Cl. .................. 477/4; 477/5; 477/6; 475/5; 180/65.7

(58) Field of Classification Search .................. None
See application file for complete search history.

(56) References Cited

U.S. PATENT DOCUMENTS

| | | | |
|---|---|---|---|
| 6,553,287 B1 * | 4/2003 | Supina et al. | 701/22 |
| 7,108,087 B2 | 9/2006 | Imai | |
| 7,226,385 B2 * | 6/2007 | Tabata et al. | 477/5 |
| 2006/0128513 A1 | 6/2006 | Tata et al. | |

* cited by examiner

*Primary Examiner*—David D. Le

(57) ABSTRACT

A vehicle powertrain for a hybrid vehicle includes an electronically variable transmission (EVT) with an input member to receive mechanical rotary power from the engine, an output member to provide mechanical rotary power to a vehicle powertrain to propel the vehicle, and an EVT gear train configured to selectively and operatively couple the input member to the output member. The EVT further includes first and second motor/generators driveably coupled to the gear train. A selectively engageable input brake mechanism is provided to create a reaction torque for the motor/generators thereby enabling the motor/generators to be used with additive power for electric propulsion or regenerative braking. The input brake improves electrical power to mechanical power conversion efficiency by reducing power circulation when the EVT is operated in electric drive, engine off mode.

18 Claims, 4 Drawing Sheets

INPUT BRAKE PROVIDING ELECTRIC ONLY FIXED GEAR

TECHNICAL FIELD

The present invention pertains generally to electric hybrid motor vehicles having an engine driving an input member of an electrically variable transmission (EVT) and, more particularly, to an EVT having a selectively operable torque transmitting device or input brake configured to restrain or mechanically ground the rotation of the input member when the vehicle is operating in an engine off, battery only propulsion mode thereby providing a reaction torque enabling the motor/generators to be used with improved electrical power to mechanical power conversion efficiency for electric propulsion or regenerative braking.

BACKGROUND OF THE INVENTION

Internal combustion engines power the majority of motor vehicles. Such engines are typically powered by the combustion of refined oil products such as diesel fuel or gasoline. The dependence on oil for energy and transportation, together with the desire to produce a more fuel efficient vehicle have lead to the development of hybrid vehicles. In the current art, hybrid vehicles are generally equipped with an electrically variable transmission (EVT). EVTs generally have an input shaft driven by the vehicle engine and an output shaft driving or being driven by the vehicle powertrain between the EVT output shaft and the vehicle's driven wheels. Connecting the input and output shafts within the EVT is a gear train having one or more differential gear sets which are selectively controllable to provide a plurality of EVT transmission operating modes. EVTs are equipped with two or more electric motor/generators, the motor/generators are adapted to provide power to or receive power from the differential gear sets. The motor/generators are connected to a storage battery or batteries in the vehicle and are adapted to receive power from the batteries to power the vehicle (for example, electric only propulsion with the vehicle engine off) or to provide power to the batteries from the drive train (example, when slowing the vehicle through regenerative braking). Examples of suitable storage batteries include lead acid batteries, nickel-metal hydride (NiMH) batteries and lithium ion (Li-Ion) batteries. The motor/generators can transform electrical power from the battery into mechanical power at different torques and speeds to drive the vehicle powertrain or driveably assist the engine during vehicle acceleration for example. Each motor/generator is operatively connected to the differential gear sets of the EVT gear train to provide a range of transmission operation characterized by continuously controllably variable speeds between the input and output shafts of the EVT. EVTs may also incorporate one or more fixed gears which are characterized by a fixed speed and torque relationship between input and output. Hybrid equipped vehicles with electrically variable transmissions are operable in several modes including modes for electric only vehicle drive (engine power off). The inclusion of the electric drive capability in the EVT allows the vehicle engine to be shut off under conditions where it is lightly loaded and inefficient, thereby providing better fuel economy and reduced emissions.

Modern electrically variable transmissions are generally of the power split transmission type, utilizing differential gearing to achieve continuously variable torque and speed ratios between the EVT input and output. The power split EVT transmission can utilize differential gearing to send a portion of its transmitted power through a pair of motor/generators, the remainder of the stick diagramming through a parallel directly geared path or gear train.

One form of differential gearing known to those skilled in the art is the planetary gear set. Planetary gear sets consist of a sun gear meshed with and orbited by one or more planetary gears, the planetary gears meshed with a ring gear. Such a combination provides the benefits of compactness and different torque and speed ratios among the members of the gear set. Differential gear sets can be built, without using planetary gear sets, for example by using bevel gears and other gears in an arrangement where the rotation speed of one gear is always a weighted average of the speeds of the other two gear members.

Hybrid electric vehicles include one or more electric energy storage devices. The typical electric energy device is a chemical storage battery. The storage battery permits the power output from the transmission to vary from the power output of the engine to the transmission, with the battery and motor/generators making up the difference or regeneratively storing the excess as in the case of regenerative vehicle braking. A control unit regulates the stick diagram between the motor/generators and the energy storage device as well as regulating power between the first and second motor/generators.

One type of EVT is the 2 mode input-compound split type, which contains a first mode input split and a second mode compound split. Operation in first or second variable-speed-ratio modes of operation may be selectively achieved by using torque transfer devices such as friction clutches for example. In the first mode, an input power split ratio is formed by the application of a first clutch and the output speed of the transmission is proportional to the speed of one motor/generator. In a second mode, a compound power split ratio range is achieved by the application of a second clutch and the output speed of the transmission is not proportional to the speed of either motor/generator but is instead proportional to the linear algebraic combination of the speeds of the two motor/generators. EVT operation at a fixed speed ratio may be obtained by operation of both of the clutches.

An EVT may be operated purely in an electrical only drive mode wherein the engine is in an off condition or mechanically disconnected from the EVT input member.

SUMMARY OF THE INVENTION

A selectively operable torque transmitting device or input brake is provided that can either be incorporated directly into or provided externally to an EVT. The selectively operable torque transmitting device locks the rotation of the EVT input member to a mechanical ground such as the EVT housing to selectively restrain or prevent the rotation of the input member when the vehicle is operating in an engine off, battery only propulsion mode. By restraining the rotation of the EVT input member, the torque transmitting device changes the mechanical configuration of the EVT's electric power-split hybrid powertrain to improve the electromechanical drive operation and efficiency of the vehicle in using electrical energy supplied from the stored electrical energy source of the vehicle.

The disclosed invention is advantageously adapted for use with hybrid vehicles having storage batteries configured to be charged from an electrical utility power grid, for example, when the vehicle is parked overnight. By providing the vehicle with batteries having the capacity and configuration to receive and store electrical energy from the electric utility grid, the hybrid vehicle is then usable for an extended range on electric only power (i.e. with the vehicle engine off) resulting in increase fuel savings. Specifically, the electrical energy supplied by the utility to charge the vehicle batteries can be utilized with higher efficiency when propelling the vehicle using the EVT's electric motors only (engine off) and thereby achieve greater driving range from the stored energy, if a torque transmitting device is applied to selectively ground or prevent the rotation of the EVT input member. The torque transmitting device is controllably operable to ground rotation of the EVT input member, thereby changing the mechanical configuration of the power-split transmission to a fixed gear ratio between one or both EVT motors and the output member of the transmission and eliminating power circulation and drive inefficiencies as discussed below.

The torque transmitting device operable to ground rotation of the EVT input member may also be applied to improve the efficiency of the usage of stored electric power by the EVT motors when reversing the vehicle in an electric only mode. The efficiency is realized by providing a reaction torque at the EVT input member so that the motor/generators can develop torque against the locked input shaft, eliminating the need for one of the electric motors to rotate or motor the vehicle engine while developing reaction torque for the other motor/generator.

Exemplary devices for selectively locking the rotation of the EVT input member to ground include an electromagnetic clutch configured to selectively lock the EVT input member and a hydraulically actuated disk brake configured to selectively lock the EVT input member, as well as various known types of wet or dry friction clutches.

The above features and advantages as well as other features and advantages of the present invention will be readily apparent from the following detailed description of the best modes for carrying out the invention when taken in connection with the accompanying drawings.

DESCRIPTION OF THE PREFERRED EMBODIMENTS

Figure 1:
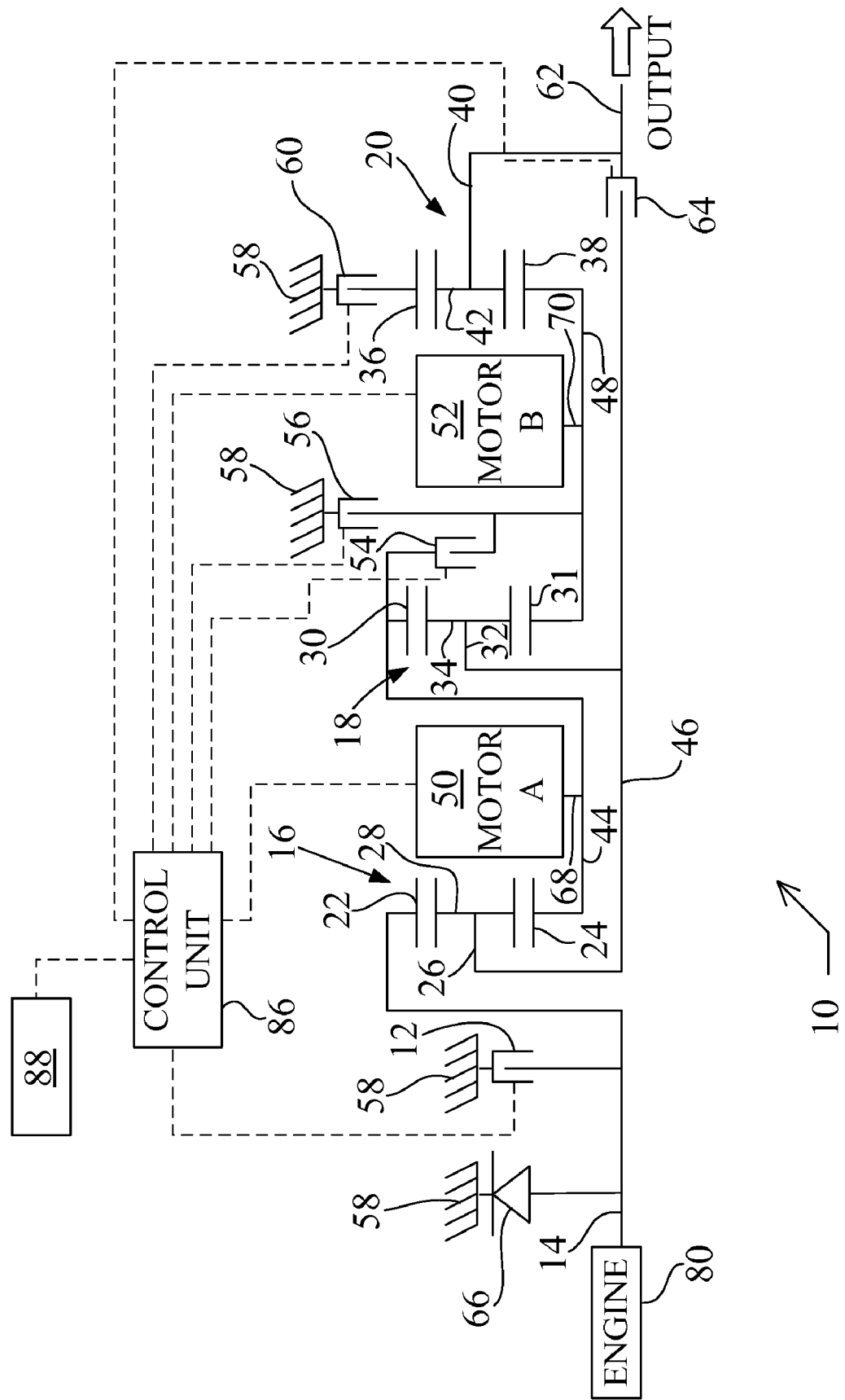
FIG. 1 is a schematic stick diagram representation of a two mode input/compound split, electrically variable transmission for a hybrid motor vehicle equipped with an input brake in accordance with the disclosed invention.

Referring to the drawings wherein like characters represent the same or corresponding parts throughout the several views, there is shown in FIG. 1 a schematic stick diagram representation of a two mode input/compound split, electrically variable transmission (EVT) 10 for a hybrid motor vehicle (not shown) equipped with an input torque transfer device consisting of an input brake 12 and/or one way clutch 66 in accordance with the disclosed invention. It should be appreciated that the illustrated electrically variable transmission is just one specific embodiment of a two mode input/compound split EVT with which the input brake 12 and/or one-way clutch 66 may be advantageously applied. In all embodiments disclosed and illustrated herein, it is to be understood that the input torque transfer device may comprise either the input brake 12 or one-way clutch 66, or both the input brake 12 and one-way clutch 66 in combination. The one way clutch 66 permits the input member 14 to rotate in a positive direction as normally driven by the engine 80 while preventing the input member 14 from rotating in a negative direction. The input brake 12 to ground 58 is selectively operable by the control unit 86 to resist rotation of the input member 14 by frictionally braking the input member 14 to ground 58. These features pertain to all descriptions and illustrations of various embodiments presented herein.

The EVT 10 includes an input member 14 through which mechanical rotary power is delivered to the EVT from a mechanical power source such as a gasoline or diesel engine (not shown). The input member 14, in some embodiments, may comprise a driven shaft mechanically connecting the input member 14 to the engine.

The electrically variable transmission illustrated in FIG. 1 utilizes three differential gear sets 16, 18 and 20, each having a first gear member, a second gear member and a third gear member. The differential gear sets 16, 18 and 20 are preferably planetary gear sets 16, 18 and 20. The first planetary gear set 16 employs an outer gear member 22, typically designated as the ring gear. The ring gear 22 circumscribes an inner gear member 24, typically designated as the sun gear. A carrier 26 rotatably supports a plurality of planet gears 28 such that each planet gear 28 meshingly engages both the outer, ring gear member 22 and the inner, sun gear member 24 of the first planetary gear set 16. The input member 14 is secured to the ring gear member 22 of the planetary gear set 16.

The planetary gear set 18 also has an outer gear member 30, often designated as the ring gear, that circumscribes an inner gear member 31, often designated as the sun gear. A plurality of planet gears 34 are also rotatably mounted in a carrier 32 such that each planet gear member 34 simultaneously, and meshingly, engages both the outer, ring gear member 30 and the inner, sun gear member 31 of the planetary gear set 18.

The planetary gear set 20 also has an outer gear member 36, also designated as the ring gear, that circumscribes an inner gear member 38, often designated as the sun gear. A plurality of planet gears 42 are also rotatably mounted in a carrier 40 such that each planet gear member 42 simultaneously, and meshingly, engages both the outer, ring gear member 36 and the inner, sun gear member 38 of the planetary gear set 20.

A first interconnecting member 44 continuously connects the sun gear 24 of the planetary gear set 16 with the ring gear 30 of the planetary gear set 18. The first gear set 16 and the second gear set 18 are compounded by a second interconnecting member 46 continuously connecting the carrier 26 of the planetary gear set 16 with the carrier 32 of the planetary gear set 18. A third interconnecting member 48 continuously connects the sun gear 31 of the planetary gear set 18 with the sun gear 38 of the planetary gear set 20.

The EVT 10 also includes electric motor/generator 'A' 50 and electric motor/generator 'B' 52. The stator of the first motor/generator 50 is secured to the transmission housing (not shown). The rotor of the first motor/generator 50 is secured to the first interconnecting member 44.

The stator of the second motor/generator 52 is also secured to the transmission housing (not shown). The rotor of the second motor/generator 52 is secured to the third interconnecting member 48.

A first torque transfer device, such as a clutch 54, selectively connects the ring gear 30 of the planetary gear set 18 to the sun gear 31 of the planetary gear set 18, thereby mechanically locking the rotation of the sun gear 31, planetary gears 34, carrier 32 and ring gear 30 to rotate together with the same rotational speed.

A second torque transfer device, such as brake 56, selectively connects the sun gear 31 of the planetary gear set 18 with the ground 58, such as the transmission housing. Activating or engaging the clutch 56 locks or grounds the sun gear 31 of planetary gear set 18 and the rotor 70 of motor/generator 52 to ground.

A third torque transfer device, such as brake 60, selectively connects the ring gear 36 of the planetary gear set 20 with the ground 58, such as the transmission housing. That is, the ring gear 36 is selectively secured against rotation by an operative connection to the non-rotatable ground 58.

The first, second and third torque transfer devices 54, 56 and 60 are employed to assist in the selection of the operational modes of the hybrid EVT transmission 10, as will be hereinafter more fully explained at least as pertains to the electric only engine off EVT operation modes pertinent to the present invention.

The output drive member 62 of the EVT 10 is secured to the carrier 40 of the planetary gear set 20.

A fourth torque transfer device, such as clutch 64, selectively connects the second interconnecting member 46 to the output member 62.

The first, second, third and fourth torque transfer devices 54, 56, 60 and 64 are employed to assist in the selection of the operational modes of the hybrid EVT transmission 10.

A control unit 86 regulates the motor speed and torque of motor/generators 50 and 52. Torque transfer devices 12, 54, 60 and 64 are selectively controlled by control unit 86 to configure the EVT into various operation modes. The control unit 86 is electrically interfaced to the electrical energy storage device such as a battery 88.

An input torque transfer device, such as the input brake 12, selectively locks the EVT input member 14 to the ground, such as the transmission housing. The input torque transfer device 12 is locked only when the vehicle engine 80 is not running. By locking the input member 14 against rotation, the EVT 10 is adapted for efficient operation in one or more battery only fixed gear modes. These modes allow both motors 50 and 52 to be used with additive power to maximize the utilization of the designed motor capacity for electric propulsion or regenerative braking, as described below.

The electrically variable transmission 10, as illustrated in FIG. 1, is a two mode input/compound split EVT having an input split low range and a compound split high range. Typically, the input split range is used for electric only propulsion mode (vehicle engine off), however, this results in motor/generator 52 spinning at a high negative speed. In an EVT transmission without the input brake 12 of the present invention, operation at compound split range with the engine 80 at zero speed requires motor/generator 52 to operate as a generator when motor/generator 50 is operating as a motor to propel the vehicle or requiring motor/generator 52 to operate as a motor whenever motor/generator 50 is generating electric power. This interaction between motor/generators 50 and 52 results in poor energy efficiency and limits the usefulness of the compound split range for electric only operation. However, if the input member of the EVT is locked or braked as by torque transfer or input brake device 12, then an additional torque reaction point is added at the EVT input member node allowing the torques on motor/generators 50 and 52 to be controlled independently. In this case, motor/generator 52 can supply power additively to motor/generator 50, eliminating circulating power and improving efficiency. With the presence of the input torque transfer device or input brake 12, the compound split range now has high torque capacity as the torques of motors 50 and 52 are additive through gear ratios to the output member 62, through two new transmission modes EV1 and EV2 as discussed more fully below.

The clutch states required to actuate the electric drive only EVT transmission modes together with the use of input brake 12 in enabling these new modes will now be discussed. As discussed earlier, the addition of the input brake 12 to the two mode input/compound split EVT provides additional electric only propulsion, engine off, fixed gear ratio modes of operation of the hybrid vehicle EVT. Two of the possible electric only propulsion EVT fixed gear ratio modes are presented herein, the first is the "EV low" (EV1) mode, and the second is the "EV high" (EV2) mode. Referring again to FIG. 1, both modes EV1 and EV2 require the engine 80 to be in an off state with the torque transfer device or input brake 12 to be engaged, thereby grounding the input member 14 to prevent the rotation of input member 14. As discussed earlier, this provides another torque reaction point to the EVT and, in particular, lock or inhibits the rotation of ring gear 22 of the planetary gear set 16 (using the specific example of FIG. 1). This enforces a fixed gearing ratio between the rotor of motor/generator 50 through the sun gear 24 and the planetary gears 28.

To enable the "EV low" (EV1) electric only propulsion EVT fixed gear ratio mode, the following clutches and brake are engaged or locked: brake 60 and torque transmission device/input brake 12. The remaining torque transfer devices 64, 56 and 54 are disengaged. Brake 60 locks the ring gear 36 of planetary gear set 20 to ground, thereby enforcing a fixed gear ratio between the rotor 70 of motor/generator 52 and the EVT output member 62. Similarly, the input brake 12 enforces a fixed gear ratio between the rotor 68 of motor/generator 50 and the rotation of the second interconnecting member 46 which connects to and drives the planetary gears 34 of the planetary gear set 18. The rotor 68 of motor/generator 50 also drives the ring gear 30 of planetary gear set 18. As the ring gear 30 and planetary gears 34 are both driven by motor/generator 50, a fixed gearing ratio is enforced between the rotational speed of rotor 68 of motor/generator 50 and the rotor 70 of motor/generator 52. As discussed above, rotor 70 of motor/generator 52 drives the EVT output member 62 at a fixed gear ratio due to the locked state of brake 60. As can be understood from the above, motor/generators 50 and 52 are driveably geared by separate fixed ratios to the transmission output member 62.

To enable the "EV high" (EV2) electric only propulsion EVT fixed gear ratio mode, the following clutches and brakes are engaged or locked: clutch 64 and torque transmission device/input brake 12 (illustrative element numbers specific to the EVT embodiment 10 depicted in FIG. 1). The remaining torque transfer devices 60, 56 and 54 are disengaged. Clutch 64 locks the rotation of the planetary gears 42 of planetary gear set 20 to the rotation of the planetary gears 28 of planetary gear set 16. The input brake 12 enforces a fixed gear ratio between the rotor 68 of motor/generator 50 and the rotation of the second interconnecting member 46 which driveably connects directly to the output member 62 through engaged clutch 64. Rotor 70 of motor/generator 52 drives the sun gear 31 of planetary gear set 18. Rotor 68 of motor/generator 50 drives the ring gear 30 of planetary gear set 18 and also drives the planetary gears 34 at a fixed gear ratio determined by the planetary gears 28 and sun gear 24 of the planetary gear set 16. The rotation speed ratio between the ring gear 30 and the planetary gears 34 being fixed, as just described, enforces a fixed gear ratio between the rotation speeds of rotors 68 and 70 of motor/generators 50 and 52. Motor/generator 52 delivers power to output member 62 through the sun gear 31 and planetary gears 34 of planetary gear set 18. As can be understood from the above, motor/generators 50 and 52 are driveably geared by separate fixed ratios to the transmission output member 62.

As can be understood from the above discussion, electric drive only EVT transmission modes EV1 and EV2 permit both motor/generators 50 and 52 to be operated in motoring mode to produce mechanical power which is additively combined for electric propulsion, maximizing the designed motor capacity for electric propulsion. Similarly, modes EV1 and EV2 enable motor/generators 50 and 52 to operate with additive generating power to maximize utilization of the designed motor capacity for regenerative braking. These fixed gear additive modes are enabled through the addition of the input brake 12 which locks the input member 14 providing a torque reaction point at the EVT input to facilitate these modes as described above. The addition of the torque transmission device or input brake 12 of the present invention eliminates circulating power and improves operating and energy efficiency of the EVT in electric only modes (engine off) thereby yielding measurable benefits in increased efficiency in electric to mechanical energy conversion and increased available electric drive torque.

If the input brake 12 is capable of lockably preventing the rotation of the input member 14 in both the positive and negative directions, then the hybrid vehicle EVT system is capable of both motoring and regenerative braking in the EV1 and EV2 modes. The torque transfer device or input brake 12 may be realized as a wet friction clutch, dry friction clutch, dog clutch, or pawl mechanism as just a few examples. The input brake 12 may also be implemented as a one way clutch 66 to ground 58, since the engine 80 is not required to spin in the reverse direction. In this case (without the input brake 12), the improved efficiency and torque capacity is provided for motoring torque at the output, but power circulation is still required for braking torque at the output. Additionally, the input brake 12 may be implemented as a mechanism known as a controllable one way clutch with two modes. In the first mode, the mechanism operates as a conventional one way clutch 66, allowing the engine 80 to free spin as long as it is in the positive direction. If the speed of the engine 80 reaches zero, the one way clutch 66 engages, preventing the engine 80 from rotating backwards. In the second mode, the one way clutch 66 mechanism locks, preventing input member 14 rotation in either direction. The mechanism may be transitioned between modes whenever the engine 80 speed is zero. This implementation is capable of providing full functionality for both motoring and regenerative braking.

The EVT has several other modes, specifically engine running modes, which are not discussed herein as these additional modes are known to those skilled in the art and while important to the functioning of the EVT, are not relevant to the understanding of the present invention.

Figure 2:
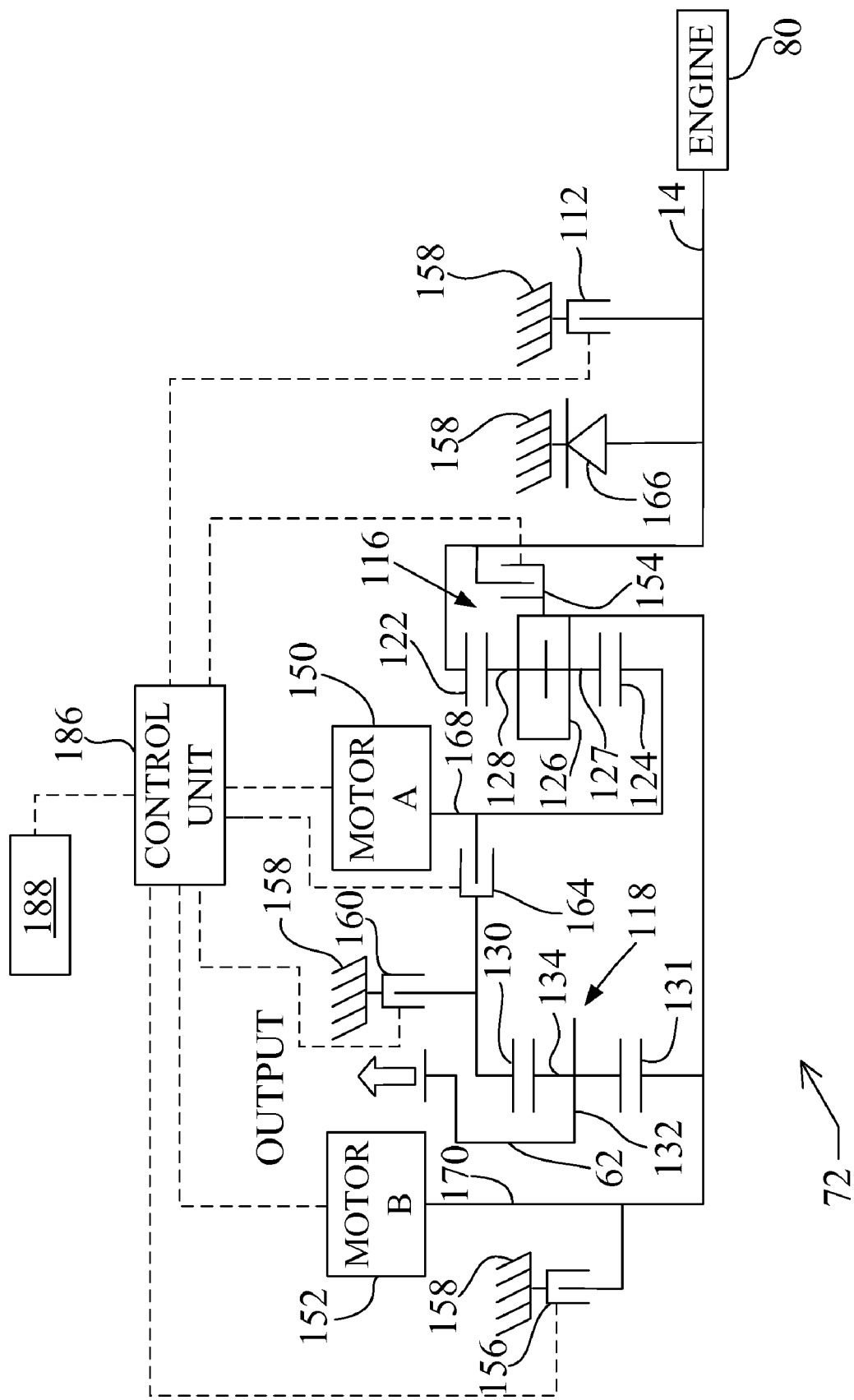
FIG. 2 is a schematic stick diagram representation of another embodiment of a two mode input/compound split, electrically variable transmission for a hybrid motor vehicle equipped with an input brake in accordance with the disclosed invention.

Turning now to FIG. 2 wherein like numbers are used to refer to like components. FIG. 2 is a schematic stick diagram representation of another embodiment of a two mode input/compound split, electrically variable transmission 72 for a hybrid motor vehicle equipped with an input brake 112 and/or one way clutch 166 in accordance with the disclosed invention. It is to be understood that wherever the input brake 112 is discussed below, the input brake 112 can be replaced with the one-way clutch 166 to achieve the EV1 and EV2 electric only drive modes discussed below. The one-way clutch 166 is operable to lock the input member 14 from rotating in a counter to normal engine operation direction, thereby locking the input member 14 to ground when the vehicle is operated in electric only propulsion modes EV1 or EV2. It should be appreciated that the illustrated electrically variable transmission 72 is just one specific embodiment of a two mode input/compound split EVT with which the input brake 112 and/or one-way clutch 166 may be advantageously applied. The one way clutch 166 permits the input member 14 to rotate in a positive direction as normally driven by the engine 80 while preventing the input member 14 from rotating in a negative direction. The input brake 112 to ground 158 is selectively operable by the control unit 186 to resist rotation of the input member 14 by frictionally braking the input member 14 to ground.

EVT 72 includes an input member 14 through which mechanical rotary power is delivered to the EVT 72 from a mechanical power source such as a gasoline or diesel engine 80. The input member 14, in some embodiments, may comprise a driven shaft mechanically connecting the input member 14 to the engine 80.

The electrically variable transmission as illustrated in FIG. 2 utilizes two differential gear sets, preferably planetary gear sets 116 and 118. The first planetary gear set 116 employs an outer gear member 122, typically designated as the ring gear. The ring gear 122 circumscribes an inner gear member 124, typically designated as the sun gear. In FIG. 2 this is a compound planetary gear set. In FIG. 2, the planetary gear set 116 has an outer ring gear member 122, that circumscribes an inner gear member typically designated as a sun gear 124. A plurality of planet gears 127, 128 are also rotatably mounted in a carrier 126 such that each planet gear member 127 meshingly engages the sun gear 124 and each planet gear member 128 simultaneously and meshingly engages the ring gear member 122 of the planetary gear set 116. The input member 14 is secured to the ring gear member 122 of the planetary gear set 116.

The planetary gear set 118 also has an outer gear member 130, often also designated as the ring gear, which circumscribes an inner gear member 131, also often designated as the sun gear. A plurality of planet gears 134 are also rotatably mounted in a carrier 132 such that each planet gear member 134 simultaneously and meshingly engages both the outer, ring gear member 130 and the inner, sun gear member 131 of the planetary gear set 118. In EVT 72 the input member 14 is driveably connected to the ring gear 122 of planetary gear set 116.

A first torque transfer device 154, such as a clutch, selectively connects the input member 14 to the carrier 126 of planetary gear set 116 thereby mechanically locking the rotation of the input member 14 and carrier 126, resulting in a fixed gear ratio between the input member 14 and the rotor 168 of motor/generator 150. The sun gear 124 of planetary gear set 116 is continuously connected to the rotor 168 of motor/generator 150.

A second torque transfer device 164, such as a clutch, selectively connects the rotor 168 of motor/generator 150 to the ring gear 130 of the planetary gear set 118.

A third torque transfer device, such as brake 160, selectively connects the ring gear 130 of the planetary gear set 118 with the ground 158, such as the transmission housing. That is, the ring gear 130 is selectively secured against rotation by an operative connection to the non-rotatable ground 158. The carrier member 132 of planetary gear set 118 is continuously connected to the output member 62. The sun gear 131 of planetary gear set 118 is continuously connected to the rotor 170 of motor/generator 152.

A fourth torque transfer device 156, such as a brake, selectively connects the rotor 170 and sun gear 131 to ground 58 preventing their rotation.

A control unit 186 regulates the motor speed and torque of motor/generators 150 and 152. Torque transfer devices 112, 154, 160 and 164 are selectively controlled by control unit 186 to configure the EVT into various operation modes. The control unit 186 is electrically interfaced to the electrical energy storage device such as a battery 188.

Similar to the earlier discussion of EVT 10 presented in FIG. 1, in FIG. 2 the torque transfer devices 154, 156, 160 and 164 are employed to assist in the selection of the operational modes of the hybrid EVT transmission 72, as will be hereinafter more fully explained.

Similar to the earlier discussion concerning FIG. 1, electrically variable transmission 72 is a two mode input/compound split EVTs having an input split low range and a compound split high range. Typically, the input split range is used for electric only propulsion mode (vehicle engine off), however, this results in motor/generator 152 spinning at a high negative speed. In an EVT transmission without the input brake 112 of the present invention, operation at compound split range with the engine 80 at zero speed requires motor/generator 152 to operate as a generator when motor/generator 150 is motoring to propel the vehicle or requiring motor/generator 152 to operate as a motor whenever motor/generator 150 is generating electric power. This interaction between motor/generators 150 and 152 results in poor efficiency and limits the usefulness of the compound split range for electric only operation, as discussed earlier. However, if the input member 14 of EVT 72 is locked or braked as by torque transfer or input brake device 112, then an additional torque reaction point is added at the EVT input member 14 allowing the torques on motor/generators 150 and 152 to be controlled independently. In this case, motor/generator 152 can supply power additively to motor/generator 150, eliminating circulating power and improving efficiency. With the presence of the input brake 112, the compound split range now has high torque capacity as the torques of motors 150 and 152 are additive through gear ratios to the output 62, through two new modes EV1 and EV2 as discussed below.

The clutch states required to actuate the electric drive only EVT transmission modes enabled together with the use of input brake 112 will now be discussed. As discussed earlier, the addition of the input brake 112 to the two mode input/compound split EVT 72 provides additional electric only propulsion, engine off, fixed gear ratio modes of operation of the hybrid vehicle EVT 72. Two of the possible electric only propulsion EVT fixed gear ration modes are presented herein, the first is the "EV low" (EV1) mode, and the second is the "EV high" (EV2) mode. Referring again to FIG. 2, both modes EV1 and EV2 require the engine 80 to be in an off state with the torque transfer device or input brake 112 to be engaged, thereby grounding the input member 14 to prevent the rotation of input member 14. As discussed earlier, this provides another torque reaction point to the EVT 72 and, in particular, lock or inhibits the rotation of either the ring gear 122. This enforces a fixed gearing ratio between the rotor 168 of motor/generator 150 and the input member 14 through the planetary gear set 116.

To enable the "EV low" (EV1) electric only propulsion EVT fixed gear ratio mode, the following torque transfer devices are engaged or locked: brake 160 and torque transmission device/input brake 112. The remaining torque transfer devices 164, 156 and 154 are disengaged. Brake 160 locks the ring gear 130 of planetary gear set 118 to ground 158, thereby enforcing a fixed gear ratio between the rotor 170 of motor/generator 152 and the EVT output member 62.

Similarly, the input brake 112 enforces a fixed gear ratio between the rotor 168 of motor/generator 150 and the rotation of the sun gear 131 by locking a member of the planetary gear set 116 to ground 158. In FIG. 2 EVT 72, input brake 112 locks ring gear 122 to ground 158. In this configuration, motor/generator 150 drives the sun gear 131 through planetary gear set 116 at a fixed gear ratio. Motor/generator 152 also drives sun gear 131. Both 150 and 152 then drive the output member 62 at a fixed gear ratio through planetary gear set 118. As can be understood from the above, motor/generators 150 and 152 are driveably geared by separate fixed ratios to the transmission output member 62.

To enable the "EV high" (EV2) electric only propulsion EVT fixed gear ratio mode, the following torque transfer devices are engaged or locked: clutch 164 and torque transmission device/input brake 112. The remaining torque transfer devices 160, 156 and 154 are disengaged. Clutch 164 locks the rotation of the rotor 168 of motor/generator 150 to the ring gear 130 of planetary gear set 118. As discussed above, input brake 112 enforces a fixed gear ratio between the rotor 168 of motor/generator 150 and the rotation of the sun gear 131 by locking a member of the planetary gear set 116 to ground 158. The rotation speed ratio between the rotor 168 of motor/generator 150 and the rotor 170 of motor/generator 152 is a fixed value due to the locking action of input brake 112 on planetary gear set 116 as described above. Motor/generator 152 delivers power to output member 62 through the sun gear 131 and planetary gears 134 of planetary gear set 118. Motor/generator 150 delivers power to output member 62 through the ring gear 130 and planetary gears 134 of planetary gear set 118, providing an output speed proportional to the speed of the two motor/generators 150 and 152.

As discussed earlier with FIG. 1, electric drive only EVT transmission modes EV1 and EV2 permit both motor/generators 150 and 152 to be operated in motoring mode to produce mechanical power which is additively combined or electric propulsion, maximizing the designed motor capacity for electric propulsion. Similarly, modes EV1 and EV2 enable motor/generators 150 and 152 to operate with additive generating power to maximize utilization of the designed motor capacity for regenerative braking. These fixed gear additive modes are enabled through the addition of the input brake device 112 which locks the input member 14 to facilitate these modes as described above. The addition of the torque transmission device or input brake 112 of the present invention eliminates circulating power and improves operating and energy efficiency of the EVT 72 in electric only modes (engine off) as described above.

EVT 72 has several 'engine on' modes which are not discussed herein as these additional modes are known to those skilled in the art and are not essential or relevant to the understanding of the present invention which is directed to engine off electric only EVT operation.

Figure 3:
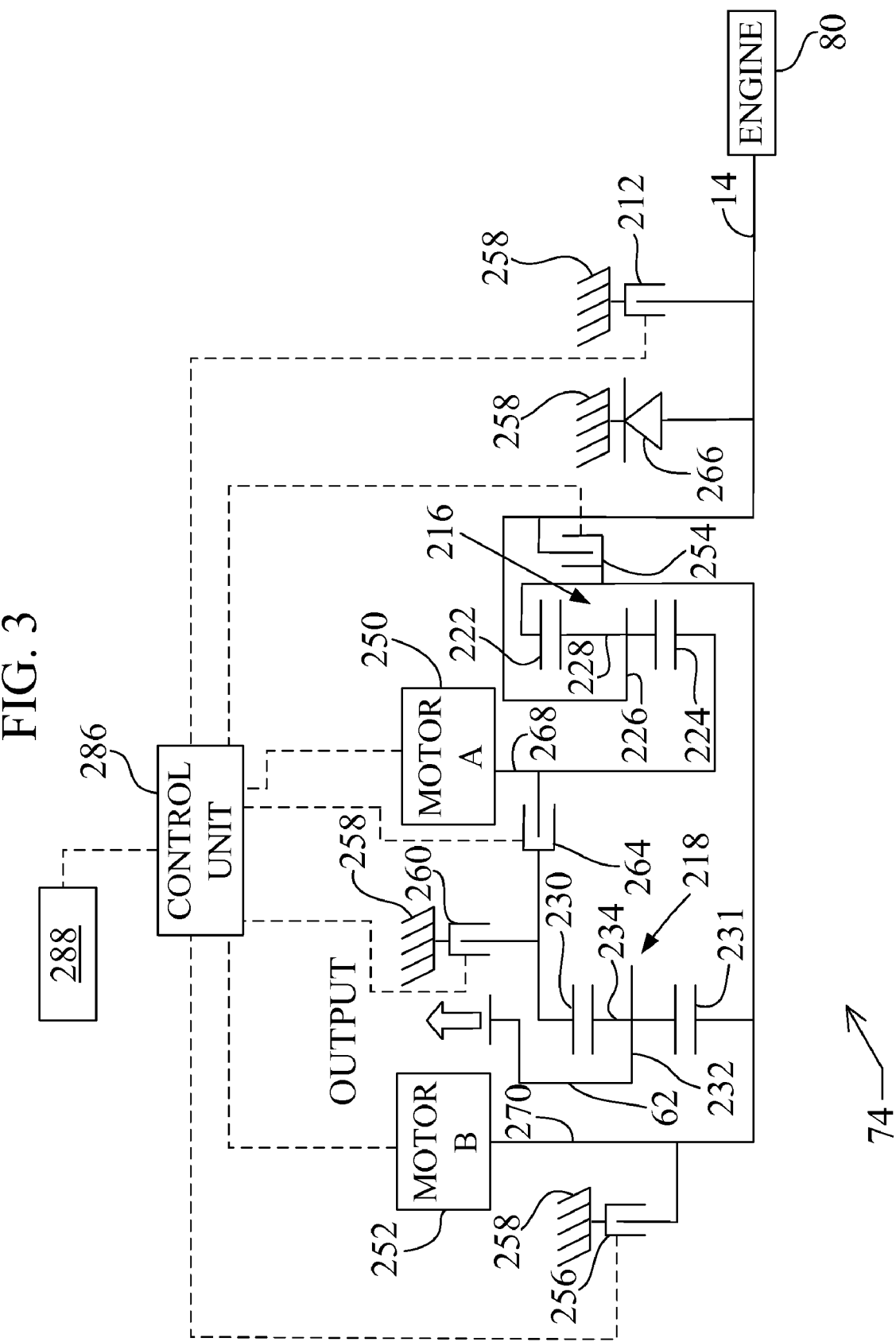
FIG. 3 is a schematic stick diagram representation of an alternate variation of the two mode input/compound split, electrically variable transmission depicted in FIG. 2, in accordance with the disclosed invention.

Turning now to FIG. 3 wherein like numbers are used to refer to like components. FIG. 3 is a schematic stick diagram representation of an alternate version of the EVT 72 illustrated and discussed earlier with in FIG. 2. In FIG. 3, electrically variable transmission 74 for a hybrid motor vehicle is equipped with an input brake 212 and/or one way clutch 266 in accordance with the disclosed invention. It is to be understood that wherever the input brake 212 is discussed below, the input brake 212 can be replaced with the one-way clutch 266 to achieve the EV1 and EV2 electric only drive modes discussed below. The one-way clutch 266 is operable to lock the input member 14 from rotating in a counter to normal engine operation direction, thereby locking the input member 14 to ground when the vehicle is operated in electric only propulsion modes EV1 or EV2. It should be appreciated that the illustrated electrically variable transmission 74 is just one specific embodiment of a two mode input/compound split EVT with which the input brake 212 and/or one-way clutch 266 may be advantageously applied. The one way clutch 266 permits the input member 14 to rotate in a positive direction as normally driven by the engine 80 while preventing the input member 14 from rotating in a negative direction. The input brake 212 to ground 258 is selectively operable by the control unit 286 to resist rotation of the input member 14 by frictionally braking the input member 14 to ground.

EVT 74 includes an input member 14 through which mechanical rotary power is delivered to the EVT 74 from a mechanical power source such as a gasoline or diesel engine 80. The input member 14, in some embodiments, may comprise a driven shaft mechanically connecting the input member 14 to the engine 80.

The electrically variable transmission as illustrated in FIG. 3 utilize two differential gear sets, preferably planetary gear sets 216 and 218. The first planetary gear set 216 employs an outer gear member 222, typically designated as the ring gear. The ring gear 222 circumscribes an inner gear member 224, typically designated as the sun gear. In FIG. 3, this is a simple planetary gearset, while in previously discussed FIG. 2 this was a compound planetary gearset. In FIG. 3, a carrier 226 rotatably supports a plurality of planet gears 228 such that each planet gear 228 meshingly engages both the outer, ring gear member 222 and the inner, sun gear member 224 of the first planetary gear set 216. The input member 14 is secured to the carrier 226 of the planetary gear set 216.

The planetary gear set 218 also has an outer gear member 230, often also designated as the ring gear, which circumscribes an inner gear member 231, also often designated as the sun gear. A plurality of planet gears 234 are also rotatably mounted in a carrier 232 such that each planet gear member 234 simultaneously and meshingly engages both the outer, ring gear member 230 and the inner, sun gear member 231 of the planetary gear set 218.

Previously discussed EVT 72 (FIG. 2) and EVT 74 differs in where mechanical power from input member 14 is delivered to the planetary gear set 216 (116 in FIG. 2). In EVT 72 the input member 14 is driveably connected to the ring gear 122 of planetary gear set 116. In FIG. 3, EVT 74, the input member 14 is driveably connected to the carrier 226 of planetary gear set 216.

A first torque transfer device 254, such as a clutch, selectively connects the input member 14 to the carrier 226 of planetary gear set 216 thereby mechanically locking the rotation of the input member 14 and carrier 226, resulting in a fixed gear ratio between the input member 14 and the rotor 268 of motor/generator 250. The sun gear 224 of planetary gear set 216 is continuously connected to the rotor 268 of motor/generator 250.

A second torque transfer device 264, such as a clutch, selectively connects the rotor 268 of motor/generator 250 to the ring gear 230 of the planetary gear set 218.

A third torque transfer device, such as brake 260, selectively connects the ring gear 230 of the planetary gear set 218 with the ground 258, such as the transmission housing. That is, the ring gear 230 is selectively secured against rotation by an operative connection to the non-rotatable ground 258. The carrier 232 of planetary gear set 218 is continuously connected to the output member 62. The sun gear 231 of planetary gear set 218 is continuously connected to the rotor 270 of motor/generator 252.

A fourth torque transfer device 256, such as a brake, selectively connects the rotor 270 and sun gear 231 to ground 258 preventing their rotation.

A control unit 286 regulates the motor speed and torque of motor/generators 250 and 252. Torque transfer devices 212, 254, 260 and 264 are selectively controlled by control unit 286 to configure the EVT into various operation modes. The control unit 286 is electrically interfaced to the electrical energy storage device such as a battery 288.

Similar to the earlier discussion of EVT 72 presented in FIG. 2, in FIG. 3 torque transfer devices 254, 256, 260 and 264 are employed to assist in the selection of the operational modes of the hybrid EVT transmission 74, as will be hereinafter more fully explained.

Similar to the earlier discussion concerning FIG. 2, electrically variable transmission 74 is a two mode input/compound split EVTs having an input split low range and a compound split high range. Typically, the input split range is used for electric only propulsion mode (vehicle engine off), however, this results in motor/generator 252 spinning at a high negative speed. In an EVT transmission without the input brake 212 of the present invention, operation at compound split range with the engine 80 at zero speed requires motor/generator 252 to operate as a generator when motor/generator 250 is motoring to propel the vehicle or requiring motor/generator 252 to operate as a motor whenever motor/generator 250 is generating electric power. This interaction between motor/generators 250 and 252 results in poor efficiency and limits the usefulness of the compound split range for electric only operation, as discussed earlier. However, if the input member 14 of EVT 74 is locked or braked as by torque transfer or input brake device 212, then an additional torque reaction point is added at the EVT input member 14 allowing the torques on motor/generators 250 and 252 to be controlled independently. In this case, motor/generator 252 can supply power additively to motor/generator 250, eliminating circulating power and improving efficiency. With the presence of the input brake 212, the compound split range now has high torque capacity as the torques of motors 250 and 252 are additive through gear ratios to the output 62, through two new modes EV1 and EV2 as discussed below.

The clutch states required to actuate the electric drive only EVT transmission modes enabled together with the use of input brake 212 will now be discussed. As discussed earlier, the addition of the input brake 212 to the two mode input/compound split EVT 74 provides additional electric only propulsion, engine off, fixed gear ratio modes of operation of the hybrid vehicle EVT 74. Two of the possible electric only propulsion EVT fixed gear ration modes are presented herein, the first is the "EV low" (EV1) mode, and the second is the "EV high" (EV2) mode. Referring again to FIG. 3, both modes EV1 and EV2 require the engine 80 to be in an off state with the torque transfer device or input brake 212 to be engaged, thereby grounding the input member 14 to prevent the rotation of input member 14. As discussed earlier, this provides another torque reaction point to the EVT 74 and, in particular, lock or inhibits the rotation of the carrier 226. This enforces a fixed gearing ratio between the rotor 268 of motor/generator 250 and the input member 14 through the planetary gear set 216.

To enable the "EV low" (EV1) electric only propulsion EVT fixed gear ratio mode, the following clutches and brake are engaged or locked: brake 260 and torque transmission device/input brake 212. The remaining torque transfer devices 264, 256 and 254 are disengaged. Brake 260 locks the ring gear 230 of planetary gear set 218 to ground 258, thereby enforcing a fixed gear ratio between the rotor 270 of motor/generator 252 and the EVT output member 62.

Similarly, the input brake 212 enforces a fixed gear ratio between the rotor 268 of motor/generator 250 and the rotation of the sun gear 231 by locking a member of the planetary gear set 216 to ground 258. In FIG. 3, EVT 74, input brake 212 locks carrier 226 to ground 258. In this configuration, motor/generator 250 drives the sun gear 231 through planetary gear set 216 at a fixed gear ratio. Motor/generator 252 also drives sun gear 231. Both motor/generators 250 and 252 then drive the output member 62 at a fixed gear ratio through planetary gear set 218. As can be understood from the above, motor/generators 250 and 252 are driveably geared by separate fixed ratios to the transmission output member 62.

To enable the "EV high" (EV2) electric only propulsion EVT fixed gear ratio mode, the following clutches and brakes are engaged or locked: clutch 264 and torque transmission device/input brake 212. The remaining torque transfer devices 260, 256 and 254 are disengaged. Clutch 264 locks the rotation of the rotor 268 of motor/generator 250 to the ring gear 230 of planetary gear set 218. As discussed above, input brake 212 enforces a fixed gear ratio between the rotor 268 of motor/generator 250 and the rotation of the sun gear 231 by locking a member of the planetary gear set 216 to ground 258. The rotation speed ratio between the rotor 268 of motor/generator 250 and the rotor 270 of motor/generator 252 is a fixed value due to the locking action of input brake 212 on planetary gear set 216 as described above. Motor/generator 252 delivers power to output member 62 through the sun gear 231 and planetary gears 234 of planetary gear set 218. Motor/generator 250 delivers power to output member 62 through the ring gear 230 and planetary gears 234 of planetary gear set 218, providing an output speed proportional to the speed of the two motor/generators 250 and 252.

As discussed earlier with FIGS. 1 and 2, electric drive only EVT transmission modes EV1 and EV2 permit both motor/generators 250 and 252 to be operated in motoring mode to produce mechanical power which is additively combined or electric propulsion, maximizing the designed motor capacity for electric propulsion. Similarly, modes EV1 and EV2 enable motor/generators 250 and 252 to operate with additive generating power to maximize utilization of the designed motor capacity for regenerative braking. These fixed gear additive modes are enabled through the addition of the input brake device 212 which locks the input member 14 to facilitate these modes as described above. The addition of the torque transmission device or input brake 212 of the present invention eliminates circulating power and improves operating and energy efficiency of the EVT 72 or 74 in electric only modes (engine off) as described above.

EVT 74 has several 'engine on' modes which are not discussed herein as these additional modes are known to those skilled in the art and are not essential or relevant to the understanding of the present invention which is directed to engine off electric only EVT operation.

Figure 4:
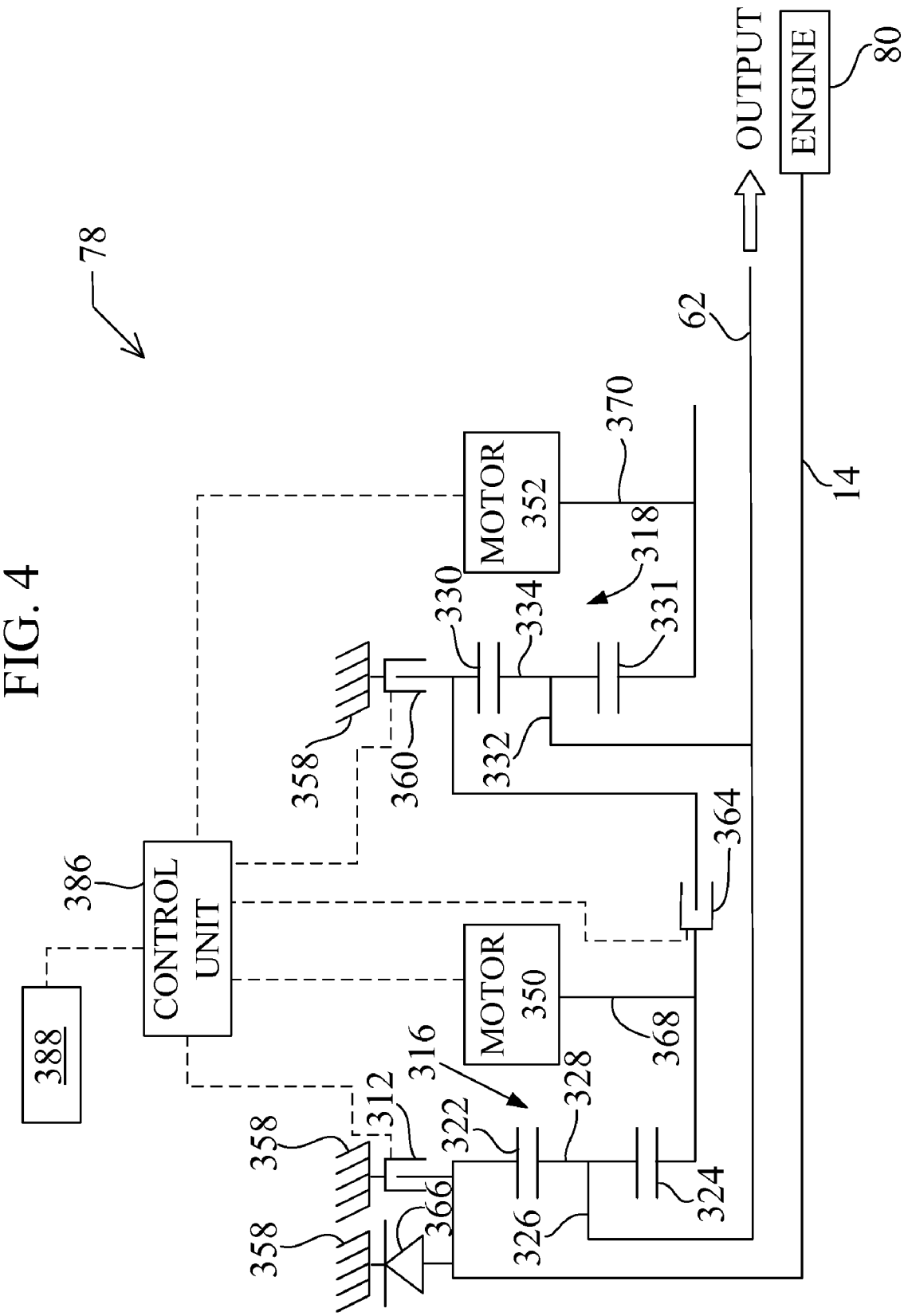
FIG. 4 is a schematic stick diagram representation of yet another embodiment of the two mode input/compound split, electrically variable transmission for a hybrid motor vehicle equipped with an input brake in accordance with the disclosed invention.

Turning now to FIG. 4 wherein like numbers are used to refer to like components. FIG. 4 is a schematic stick diagram representation of another embodiment of a two mode input/compound split, electrically variable transmission 78 for a hybrid motor vehicle equipped with an input brake 312 and/or one way clutch 366 in accordance with the disclosed invention. It is to be understood that wherever the input brake 312 is discussed below, the input brake 312 can be replaced with the one-way clutch 366 to achieve the EV1 and EV2 electric only drive modes discussed below. The one-way clutch 366 is operable to lock the input member 14 from rotating in a counter to normal engine operation direction, thereby locking the input member 14 to ground when the vehicle is operated in electric only propulsion modes EV1 or EV2. It should be appreciated that the illustrated electrically variable transmission 78 is just one specific embodiment of a two mode input/compound split EVT with which the input brake 312 and/or one-way clutch 366 may be advantageously applied. The one way clutch 366 permits the input member 14 to rotate in a positive direction as normally driven by the engine 80 while preventing the input member 14 from rotating in a negative direction. The input brake 312 to ground 358 is selectively operable by the control unit 386 to resist rotation of the input member 14 by frictionally braking the input member 14 to ground.

The EVT 78 includes an input member 14 through which mechanical rotary power is delivered to the EVT 78 from a mechanical power source such as a gasoline or diesel engine 80. The input member 14, in some embodiments, may comprise a driven shaft mechanically connecting the input member 14 to the engine 80.

The electrically variable transmission as illustrated in FIG. 4 utilizes two differential gear sets, preferably planetary gear sets 316 and 318. The first planetary gear set 316 employs an outer gear member 322, typically designated as the ring gear. The ring gear 322 circumscribes an inner gear member 324, typically designated as the sun gear. A carrier 326 rotatably supports a plurality of planet gears 328 such that each planet gear 328 meshingly engages both the outer, ring gear member 322 and the inner, sun gear member 324 of the first planetary gear set 316. The input member 14 is secured to the ring gear member 322 of the planetary gear set 316.

The planetary gear set 318 also has an outer gear member 330, often also designated as the ring gear, which circumscribes an inner gear member 331, also often designated as the sun gear. A plurality of planet gears 334 are also rotatably mounted in a carrier 332 such that each planet gear member 334 simultaneously and meshingly engages both the outer, ring gear member 330 and the inner, sun gear member 331 of the planetary gear set 318.

The input member 14 is driveably connected to the ring gear 322 of the planetary gear set 316 thereby mechanically locking the rotation of the input member 14 and ring gear 316. The sun gear 324 of planetary gear set 316 is continuously connected to the rotor 368 of motor/generator 350. The carrier 326 of planetary gear set 316 is continuously connected to the carrier 332 of planetary gear set 328, both carriers 326 and 332 are also continuously driveably connected to the output member 62 of the EVT. The sun gear 331 of planetary gear set 318 is continuously connected to the rotor 370 of motor/generator 352.

A first torque transfer device 364, such as a clutch, selectively connects the rotor 368 of motor/generator 350 to the ring gear 330 of the planetary gear set 318. A second torque transfer device, such as brake 360, selectively connects the ring gear 330 of the planetary gear set 318 with the ground 358, such as the transmission housing. That is, the ring gear 330 is selectively secured against rotation by an operative connection to the non-rotatable ground 358. The carrier 332 of planetary gear set 318 is continuously connected to the output member 62.

A control unit 386 regulates the motor speed and torque of motor/generators 350 and 352. Torque transfer devices 312, 354, 360 and 364 are selectively controlled by control unit 386 to configure the EVT into various operation modes. The control unit 386 is electrically interfaced to the electrical energy storage device such as a battery 388.

Similar to the earlier discussion of EVT 10 presented in FIG. 1, in FIG. 4 torque transfer devices 360 and 354 together with input brake/torque transfer device 312 are employed to assist in the selection of the engine-off battery-only operational modes of the hybrid EVT transmission 78, as will be hereinafter more fully explained.

Similar to the earlier discussion concerning FIG. 1, electrically variable transmission 78 is of the two mode input/compound split EVT having an input split low range and a compound split high range. Typically, the input split range is used for electric only propulsion mode (vehicle engine off), however, this results in motor/generator 352 spinning at a high negative speed. In an EVT transmission without the input brake 312 of the present invention, operation at compound split range with the engine 80 at zero speed requires motor/generator 352 to operate as a generator when motor/generator 350 is motoring to propel the vehicle or requiring motor/generator 352 to operate as a motor whenever motor/generator 350 is generating electric power. This interaction between motor/generators 350 and 352 results in poor efficiency and limits the usefulness of the compound split range for electric only operation, as discussed earlier. However, if the input member 14 of EVT 78 is locked or braked as by torque transfer or input brake device 312, then an additional torque reaction point is added at the EVT input member 14 allowing the torques on motor/generators 350 and 352 to be controlled independently. In this case, motor/generator 352 can supply power additively to motor/generator 350, eliminating circulating power and improving efficiency. With the presence of the input brake 312, the compound split range now has high torque capacity as the torques of motors 350 and 352 are additive through gear ratios to the output 62, through two new modes EV1 and EV2 as discussed below.

The clutch states required to actuate the electric drive only EVT transmission modes enabled together with the use of input brake 312 will now be discussed. As discussed earlier, the addition of the input brake 312 to the two mode input/compound split EVT 78 provides additional electric only propulsion, engine off, fixed gear ratio modes of operation of the hybrid vehicle EVT 78. Two of the possible electric only propulsion EVT fixed gear ration modes are presented herein, the first is the "EV low" (EV1) mode, and the second is the "EV high" (EV2) mode. Referring again to FIG. 4, both modes EV1 and EV2 require the engine 80 to be in an off state with the torque transfer device or input brake 312 to be engaged, thereby grounding the input member 14 to prevent the rotation of input member 14. As discussed earlier, this provides another torque reaction point to the EVT 78 and, in particular, locks or inhibits the rotation of either the ring gear 322. This enforces a fixed gearing ratio between the rotor 368 of motor/generator 350 and the output member 62 through the planetary gear set 316.

To enable the "EV low" (EV1) electric only propulsion EVT fixed gear ratio mode, the following torque transfer devices are engaged or locked: brake 360 and torque transmission device/input brake 312. The remaining clutch 364 is disengaged. Brake 360 locks the ring gear 330 of planetary gear set 318 to ground 358, thereby enforcing a fixed gear ratio between the rotor 370 of motor/generator 352 and the EVT output member 62 through carrier 332 of planetary gear set 318. As discussed above, with input brake 312 engaged a fixed gear ratio is also enforced between the rotor 368 of motor/generator 350 and the output member 62 through the planetary gear set 316. Therefore, both motor/generators 350 and 352 are configured to drive in parallel the output member 62 at fixed gear ratios when in the "EV low" (EV1) mode.

To enable the "EV high" (EV2) electric only propulsion EVT fixed gear ratio mode, the following clutches and brakes are engaged or locked: clutch 364 and torque transmission device/input brake 312. The remaining torque transfer device 360 is disengaged. Clutch 364 locks the rotation of the rotor 368 of motor/generator 350 to the ring gear 330 of planetary gear set 318. As described before in discussions of EV1 mode, with the input brake 312 engaged a fixed gear ratio is also enforced between the rotor 368 of motor/generator 350 and the output member 62 through the planetary gear set 316. Motor/generator 352 is driveably connected to output member 62 through the carrier 332 of planetary gear set 318. The gearing ratio at which the rotor 370 of motor/generator 352 drives the output member 62 is a function of the rotary speed of the rotor 368 of motor/generator 350 as well as the gear ratios between the ring gear 330, planetary gears 334 and sun gear 331 of planetary gear set 318.

As discussed earlier with FIG. 1, electric drive only EVT transmission modes EV1 and EV2 permit both motor/generators 350 and 352 to be operated in motoring mode to produce mechanical power which is additively combined or electric propulsion, maximizing the designed motor capacity for electric propulsion. Similarly, modes EV1 and EV2 enable motor/generators 350 and 352 to operate with additive generating power to maximize utilization of the designed motor capacity for regenerative braking. These fixed gear additive modes are enabled through the addition of the input brake device 312 which locks the input member 14 to facilitate these modes as described above. The addition of the torque transmission device or input brake 312 of the present invention eliminates circulating power and improves operating and energy efficiency of the EVT 78 in electric only modes (engine off) as described above.

The electric drive only EVT transmission modes are particularly beneficial for use in "plug-in hybrid" applications, that is, a hybrid vehicle that operates in a battery charge depleting mode during a drive schedule, with the battery charge at least partially received from an external off-vehicle power source. One example is a hybrid vehicle configured to receive a substantial electrical charge overnight by plugging or connecting a power cord of the vehicle into an electrical receptacle receiving power from an electric utility. The EVT transmission modes, enabled at least partially through the input brake/torque transfer device 312, extend vehicle range on battery only engine off operation by improving the electrical energy efficiency of the EVT as discussed earlier.

In all FIGS. 1 through 4, the input torque transfer device/input brake (12, 112, 212, and 312) can include a one way clutch device (66, 166, 266, and 366). The one way clutch (66, 166, 266, and 366) is operable to allow the input member 14 to rotate freely as long as the rotation is in a positive (normal engine operation) direction, i.e. the direction at which a normally operating engine 80 drives the input member 14. The one way clutch (66, 166, 266, and 366) is operable to prevent the input member 14 from rotating in a negative direction (opposite to the direction of normal engine operation) by engaging and locking the input member 14 to ground (58, 158, 258, and 358).

While the best modes for carrying out the invention have been described in detail, those familiar with the art to which this invention relates will recognize various alternative designs and embodiments for practicing the invention within the scope of the appended claims.

The invention claimed is:

1. A vehicle powertrain for an electric hybrid vehicle providing improved energy efficiency and output torque during engine-off battery-only operation, said powertrain comprising:

an electronically variable transmission (EVT) comprising:
    an input member operatively connected to receive mechanical rotary power from a vehicle engine;
    an output member to provide mechanical rotary power to motively propel said vehicle;

a gear train configured to selectively and operatively couple said input member to said output member;

a first motor/generator adapted to convert bi-directionally between electrical and mechanical power, said first motor/generator driveably coupled to said gear train, said motor/generator for receiving power from or providing power to said gear train;

a second motor/generator adapted to convert bi-directionally between electrical and mechanical power, said second motor/generator driveably coupled to said gear train, said second motor/generator for receiving power from or providing power to said gear train; and at least one EVT torque transfer device selectively operable together with an input torque transfer device to configure said gear train into at least one electric power only fixed gear ratio electric drive mode;

said input torque transfer device selectively engageable to torsionally resist rotation of said input member, said input torque transfer device operable together with said EVT torque transfer devices to configure said transmission to operate in one or more battery fixed gear modes, enabling both motor/generators to be used with additive power for electric propulsion or regenerative braking, said input torque transfer device improving electrical power to mechanical power conversion efficiency by reducing power circulation when said EVT is operated in electric drive, engine off mode;

said input torque transfer device including one of or both of a one way clutch to ground and an input brake to ground, said one way clutch connected to said input member permitting said input member to rotate in a positive direction as normally driven by said engine while preventing said input member from rotating in a negative direction, said input brake to ground selectively operable to resist rotation of said input member by frictionally braking said input member to ground;

an energy storage device electrically interfaced to said motor/generators for providing electrical power to and receiving electrical power from said motor/generators; and a control unit adapted to selectively control motoring/generating modes including power and torque of each motor/generator, said control unit selectively operating said EVT torque transfer devices, said control unit adapted to selectively engage said input brake device, wherein said engine is in an off condition before said input brake is engaged and wherein said input brake is released before said engine is started.

2. The vehicle powertrain of claim 1, wherein
said one way clutch comprises any of a dog clutch or a pawl mechanism.

3. The vehicle powertrain of claim 1, wherein the vehicle powertrain is used in a plug-in hybrid application, wherein the vehicle operates in an engine-off battery charge depleting mode during a drive schedule, wherein the battery charge originated from an external off-vehicle power source.

4. The vehicle powertrain of claim 3, wherein said energy storage device comprises any of at least one lead acid battery, at least one nickel-metal hydride (NiMH) battery or at least one lithium ion (Li-Ion) battery.

5. The vehicle powertrain of claim 1, wherein
said gear train comprises:
a first planetary gear set comprising:
a sun gear;
a carrier having at least one planetary gear orbiting and meshably engaging said sun gear; and
a ring gear surrounding said sun gear and said at least one planetary gear, said ring gear meshably engaging said planetary gears; and a second planetary gear set comprising:
a sun gear;
a carrier having at least one planetary gear orbiting and meshably engaging said sun gear; and
a ring gear surrounding said sun gear and said at least one planetary gear, said ring gear meshably engaging said planetary gears; and wherein
said first motor/generator connected to said sun gear of said first planetary gear set; and
said output member driveably connected to said carrier of said second planetary gear set.

6. The vehicle powertrain of claim 5, wherein
said input brake comprises any of a wet friction clutch, a dry friction clutch, or a hydraulically operated disc brake.

7. The vehicle powertrain of claim 5, wherein said EVT has at least one electric drive only EVT transmission mode at least partially enabled by engaging said input torque transfer device.

8. The vehicle powertrain of claim 7, wherein said at least one electric drive only EVT transmission mode adapts said EVT to driveably engage both motor/generators in a regenerative braking generator mode to maximize utilization of motor/generator capacity for regenerative braking.

9. The vehicle powertrain of claim 7, wherein said at least one electric drive only EVT transmission mode comprises at least two electric drive only EVT transmission modes; and wherein
said at least one electric drive only EVT transmission mode driveably couples each motor/generator to said output member at a fixed gear ratio.

10. The vehicle powertrain of claim 7, wherein said at least one electric drive only EVT transmission mode adapts said EVT to driveably engage both motor/generators in a motoring mode to maximize utilization of motor capacity for electric propulsion.

11. The vehicle powertrain of claim 5, wherein
said gear train further comprising:
a third planetary gear set comprising:
a sun gear;
a carrier having at least one planetary gear orbiting and meshably engaging said sun gear; and
a ring gear surrounding said sun gear and said at least one planetary gear, said ring gear meshably engaging said planetary gears;
said input member driveably connected to said ring gear of said first planetary gear set;
a first interconnecting member continuously connecting said sun gear of said first planetary gear set to said ring gear of said second planetary gear set, wherein said first motor/generator is drivably coupled to the gear train through a continuous connection to said first interconnecting member;
a second interconnecting member continuously connecting the carrier of said first planetary gear set to the carrier of said second planetary gear set; and
a third interconnecting member continuously connecting said sun gear of said second planetary gear set to said sun gear of said third planetary gear set, wherein said second motor/generator is drivably coupled to the gear train through a continuous connection to the third interconnecting member;

wherein said at least one EVT torque transfer device comprises:
- a first torque transfer device selectively connecting said ring gear of said second planetary gear set to said sun gear of said second planetary gear set;
- a second torque transfer device selectively connecting said sun gear of said second planetary gear set to a mechanical ground, wherein said second torque transfer device is operable as a brake to resist or stop rotation of said sun gear of said second planetary gear set;
- a third torque transfer device selectively connecting said ring gear of said third planetary gear set to a mechanical ground, wherein said third torque transfer device is operable as a brake to resist or stop rotation of said ring gear of said third planetary gear set; and
- a fourth torque transfer device selectively connecting said second interconnecting member to said output member, wherein said first, second third and fourth torque transfer devices are selectively operable to configure operating modes of said EVT;

wherein a first or EV1 fixed gear ratio electric only propulsion mode is enabled by engaging said input torque transfer device and engaging said third torque transfer device with remaining torque transfer devices disengaged, wherein said first and said second motor generators are drivably geared by separate fixed ratios to said output member; and wherein a second or EV2 fixed gear ratio electric only propulsion mode is enabled by engaging said input torque transfer device and engaging said fourth torque transfer device with remaining torque transfer devices disengaged, wherein said first and said second motor generators are drivably geared by separate fixed ratios to said output member.

12. The vehicle powertrain of claim 11, wherein the vehicle powertrain is used in a plug-in hybrid application, wherein the vehicle operates in an engine-off battery charge depleting mode during a drive schedule, wherein the battery charge originated from an external off-vehicle power source.

13. The vehicle powertrain of claim 5, wherein
said input member driveably connected to said ring gear of said first planetary gear set;
said carrier of said first planetary gear set is connected to said sun gear of said second differential gear set;
wherein said at least one EVT torque transfer device comprises:
- a first torque transfer device selectively connecting said input member to said ring gear of said first planetary gear set;
- a second torque transfer device selectively connecting said first motor/generator to said ring gear of said second planetary gear set;
- a third torque transfer device selectively connecting said ring gear of said second planetary gear set to a mechanical ground, wherein said third torque transfer device is operable as a brake to resist or stop rotation of said ring gear of said second planetary gear set; and
- a fourth torque transfer device selectively connecting said second motor/generator to said mechanical ground, wherein said fourth torque transfer device is operable as a brake to resist or stop rotation of said second motor/generator, wherein said first, second third and fourth torque transfer devices are selectively operable to configure operating modes of said EVT;

wherein a first or EV1 fixed gear ratio electric only propulsion mode is enabled by engaging said input torque transfer device and engaging said third torque transfer device with remaining torque transfer devices disengaged, wherein said first and said second motor generators are drivably geared by separate fixed ratios to said output member; and wherein a second or EV2 fixed gear ratio electric only propulsion mode is enabled by engaging said input torque transfer device and engaging said second torque transfer device with remaining torque transfer devices disengaged, wherein said first and said second motor generators are drivably geared by separate fixed ratios to said output member.

14. The vehicle powertrain of claim 13, wherein the vehicle powertrain is used in a plug-in hybrid application, wherein the vehicle operates in an engine-off battery charge depleting mode during a drive schedule, wherein the battery charge originated from an external off-vehicle power source.

15. The vehicle powertrain of claim 5, wherein
said input member driveably connected to said carrier of said first planetary gear set;
said ring gear of said first planetary gear set is connected to said sun gear of said second differential gear set;
wherein said at least one EVT torque transfer device comprises:
- a first torque transfer device selectively connecting said input member to said carrier of said first planetary gear set;
- a second torque transfer device selectively connecting said first motor/generator to said ring gear of said second planetary gear set;
- a third torque transfer device selectively connecting said ring gear of said second planetary gear set to a mechanical ground, wherein said third torque transfer device is operable as a brake to resist or stop rotation of said ring gear of said second planetary gear set; and
- a fourth torque transfer device selectively connecting said second motor/generator to said mechanical ground, wherein said fourth torque transfer device is operable as a brake to resist or stop rotation of said second motor/generator, wherein said first, second third and fourth torque transfer devices are selectively operable to configure operating modes of said EVT;

wherein a first or EV1 fixed gear ratio electric only propulsion mode is enabled by engaging said input torque transfer device and engaging said third torque transfer device with remaining torque transfer devices disengaged, wherein said first and said second motor generators are drivably geared by separate fixed ratios to said output member; and wherein a second or EV2 fixed gear ratio electric only propulsion mode is enabled by engaging said input torque transfer device and engaging said second torque transfer device with remaining torque transfer devices disengaged, wherein said first and said second motor generators are drivably geared by separate fixed ratios to said output member.

16. The vehicle powertrain of claim 15, wherein the vehicle powertrain is used in a plug-in hybrid application, wherein the vehicle operates in an engine-off battery charge depleting mode during a drive schedule, wherein the battery charge originated from an external off-vehicle power source.

17. The vehicle powertrain of claim 5, wherein
said input member is driveably connected to said ring gear of said first planetary gear set;
said carrier of said first planetary gear set is continuously connected to said carrier of said second differential gear set;

said first motor/generator is drivably coupled to the gear train through a continuous connection to said sun gear of said first planetary gear set; and said second motor/generator is drivably coupled to the gear train through a continuous connection to said sun gear of said second planetary gear set;

wherein said at least one EVT torque transfer device comprises:

a first torque transfer device selectively connecting said first motor/generator to said ring gear of said second planetary gear set; and a second torque transfer device selectively connecting said ring gear of said second planetary gear set to a mechanical ground, wherein said second torque transfer device is operable as a brake to resist or stop rotation of said ring gear of said second planetary gear set, wherein said first and second torque transfer devices are selectively operable to configure operating modes of said EVT;

wherein a first or EV1 fixed gear ratio electric only propulsion mode is enabled by engaging said input torque transfer device and engaging said second torque transfer device with remaining torque transfer devices disengaged, wherein said first and said second motor generators are drivably geared by separate fixed ratios to said output member; and wherein a second or EV2 fixed gear ratio electric only propulsion mode is enabled by engaging said input torque transfer device and engaging said first torque transfer device with remaining torque transfer devices disengaged, wherein said first and said second motor generators are drivably geared by separate fixed ratios to said output member.

18. The vehicle powertrain of claim 17, wherein the vehicle powertrain is used in a plug-in hybrid application, wherein the vehicle operates in an engine-off battery charge depleting mode during a drive schedule, wherein the battery charge originated from an external off-vehicle power source.

* * * * *